United States Patent Office 3,341,565
Patented Sept. 12, 1967

3,341,565
PROCESS FOR PREPARING 2,6-DICHLOROBENZONITRILE
Lenze Hartstra and Haaike J. Visser, Amsterdam, Netherlands, assignors to Shell Oil Company, New York, N.Y., a corporation of Delaware
No Drawing. Filed Jan. 17, 1964, Ser. No. 338,307
Claims priority, application Netherlands, Jan. 22, 1963, 288,047
4 Claims. (Cl. 260—465)

This invention relates to a process for the manufacture of 2,6-dichlorobenzonitrile.

2,6-dichlorobenzonitrile is a useful herbicide, and further, is readily converted to 2,6-dichlorothiobenzamide, another very useful herbicide of different biological properties. Therefore, it is desirable that a process for commercial production of 2,6-dichlorobenzonitrile be available. The process of this invention offers a process for the efficient production of this nitrile on a large scale.

According to this invention such a process has been found, for it has been discovered that 2-nitro-6-chlorotoluene, a starting material readily available, can be reacted with chlorine in the presence of a tertiary amine to efficiently yield 2,6-dichlorobenzonitrile. This process also has been found to effectively convert 2,6-dinitrotoluene, another readily available compound, to the nitrile.

The chlorinating agent is preferably free chlorine. Chlorinating agents that give off chlorine under the conditions of the reaction, such as sulfuryl chloride and phosphorus pentachloride, are also suitable. If so desired, the chlorine, or some of it, can also be allowed to be formed in situ, for instance from HCl. A very suitable chlorinating agent is also thionyl chloride. The use of nitrogen oxide halides, such as nitrosyl chloride, which can also be considered as chlorinating agents, are because of the special nature of the reaction, encompassed in a companion application, U.S. patent application Ser. No. 338,320, filed Jan. 17, 1964.

It is clear that for the conversion of a methyl group into a nitrile group at least one nitro group must be replaced by chlorine. It has been found that as a rule higher yields are obtained if more than the amount of chlorinating agent needed theoretically to replace an $NO_2$-group is applied. Good results are obtained when 2 to 6, and in particular 3 to 5, molar equivalents of the chlorinating agent, as referred to the nitro groups present in the starting compound, are used.

Preferably a gaseous chlorinating agent is used, the starting compound preferably being in the liquid form, for instance in the molten state or as a solution. If desired, however, the two reaction components can be caused to react together either in the gas phase or in the liquid phase. The gaseous chlorinating agent is generally passed for 8 to 20 hours through the dissolved or molten starting material, a tertiary amine also being present. In some cases shorter or longer reaction times may be advantageous. The feed rate is preferably equivalent to 0.2–0.7 mole of chlorinating agent per mole of starting compound per hour, and in particular to 0.3–0.5 mole per mole per hour.

An essential requirement in the new process according to the invention is the admixture of a tertiary amine to the reaction mixture. The choice of a suitable amine is in the first place determined by its stability under the conditions to be applied in the reaction. Naturally, amines that are apt to decompose to a high degree under the conditions prevailing in the reaction are unsuitable. On the other hand, the conversion of the amine into a derivative thereof during the reaction is as a rule not harmful, as, for instance the replacement of a nitro group by halogen, or the formation of a salt, an addition compound or a quaternary nitrogen base.

Heterocyclic amines have proved very satisfactory. This is true particularly of those that contain one or more $C=N$ groups in a ring. Particularly suitable are heteroaromatic nitrogen bases. Suitable materials are therefore compounds as N-methyl pyrrole, thiazole, N-methyl imidazole, indole and derivatives thereof. Preferably, a heterocyclic amine containing a pyridine nucleus in the molecule is used, such as pyridine and derivatives thereof, especially its homologs, in particular the picolines, lutidines and collidine.

Fused ring pyridine derivatives, such as quinoline and derivatives thereof, are also suitable. Excellent results were obtained with pyridine and beta-picoline.

The tertiary amine can be applied in catalytic quantities. Generally at least 0.008 mole per mole of the toluene starting compound is necessary, while more than 0.22 mole per mole generally lowers the yield. Optimum yields are often obtained with 0.02–0.12 mole per mole and in particular 0.03–0.06 mole per mole. In certain cases, however, the optimum quantities of the amine may be higher or lower.

The presence of a solvent is not essential, but may often be an advantage. Suitable solvents are, for instance, aromatic hydrocarbons, such as benzene, chlorinated and fluorinated hydrocarbons, such as 1,2-dichloroethane, o-dichlorobenzene and more highly chlorinated benzene derivatives. Notably, o-dichlorobenzene and 1,2,4-trichlorobenzene have often proved to be very suitable. The reaction is generally performed in a relatively concentrated medium, usually containing not more than 5–20% by weight of solvent calculated on the reaction mixture.

The reaction temperature is as a rule not lower than 120° C. and not higher than 240° C. Higher or lower temperatures are not excluded, however. Preferably temperatures of 150–210° C. are applied and in particular from 170–190° C.

If desired, the reaction can be carried out under irradiation by ultra-violet light. In some cases this may accelerate the reaction at the beginning.

It is generally very important that the water formed during the reaction should be removed from the reaction mixture. This is preferably done as it is formed, for instance by azeotropic or non-azeotropic distillation.

The process according to the invention can be carried out batchwise or continuously.

As a rule the reaction is allowed to take place under atmospheric pressure. Higher pressures may sometimes be advantageous for increasing the reaction rate and/or the yield. If so desired, reduced pressure can also be applied.

After the reaction has come to an end, the nitrile formed is isolated by any of the customary techniques. As a rule a method is preferred in which the reaction mixture is poured into a suitable solvent from which the nitrile precipitates or crystallizes out. For this purpose gasoline or halogenated hydrocarbons, such as $CCl_4$, have in many cases proved very suitable. If the nitrile already precipitates in the reaction medium, for instance when the latter cools down, it can be directly separated from it. Washing with the solvent is then often sufficient, if less stringent requirements are made on the purity of the product.

After separation of the nitrile it is often economically attractive to isolate one or more of the by-products and/or to subject them to further reactions. This is particularly important if such products can also be converted into the required nitrile. Thus, the mixture obtained in preparing 2,6-dichlorobenzonitrile from 6-chloro-2-nitro or 2,6-dinitrotoluene, contains, among other compounds, 2,6-dichlorobenzal chloride, which can easily be converted into the same nitrile, for instance via the corresponding aldehyde and the oxime, or direct via the oxime. The remaining mixture can be used for this purpose also without previously isolating the benzal chloride.

The apparatus consisted of a reaction vessel of 0.7 litre capacity, fitted with a reflux condenser, a gas inlet tube, a stirrer and a thermocouple. In order to be able to remove the water formed, the reflux condenser had been connected by a side tube to a separating funnel.

In the reaction vessel a mixture of the starting product and a tertiary amine, with or without a solvent, was heated to the required temperature. A stream of the gaseous halogenating agent was subsequently passed through the mixture.

The nitrile formed was isolated by pouring the reaction mixture into gasoline (boiling range: 100–120° C.), the resultant precipitate being filtered off. In other cases the reaction mixture was distilled to a bottom temperature of 210° C. at a pressure of 4 mm. Hg, after which the nitrile in the distillate was filtered off and washed with gasoline. Purification by recrystallization, for instance from gasoline, generally proved to be unnecessary.

The results obtained under various reaction conditions are given below.

*Example I*

The starting mixture consisted of 500 grams of 6-chloro-2-nitrotoluene (2.92 mole) and 10 grams of pyridine (4.34% m.). At a temperature of 180° C. chlorine was fed at a rate of 0.4 mole $Cl_2$ per mole of the starting product per hour. The yield of 2,6-dichlorobenzonitrile at the end of 10 hours was 22% of the theory. Table I also gives the ratios, as determined by gas-chromatographic analysis, of some of the by-products formed during the reaction after various intervals of time.

TABLE I

| Components | Percent w. at hours reaction time indicated | | | | |
|---|---|---|---|---|---|
| | 2 | 4 | 6 | 8 | 10 |
| 2,6-dichlorobenzonitrile | 2.4 | 7.4 | 14.3 | 16.0 | 17.8 |
| 2,6-dichlorobenzal chloride | 0.4 | 7.6 | 24.3 | 39.7 | 50.8 |
| 2,6-dichlorobenzyl chloride | 18.2 | 43.7 | 36.4 | 20.2 | 9.0 |
| 6-chloro-2-nitrotoluene | 34.4 | 0.8 | 0.8 | | |

Analogous results were obtained with 20 grams of pyridine. The yield was 23% of the theory. When 50 grams of pyridine was used much residue was formed.

*Example II*

The reaction conditions were as described in Example I, but instead of pyridine, beta-picoline was used (10 grams=3.7% m.). Table II gives the composition of the reaction mixture at the end of 10 hours' reaction time. For comparison, the percentages obtained with pyridine are also included.

TABLE II

| Components | Percent w. at hours reaction time indicated | |
|---|---|---|
| | Beta-picoline (3.7% m.) | Pyridine (4.34% m.) |
| 2,6-dichlorobenzonitrile | 15.3 | 17.8 |
| 2,6-dichlorobenzal chloride | 52.6 | 50.8 |
| 2,6-dichlorobenzyl chloride | 17.8 | 9.0 |
| 6-chloro-2-nitrotoluene | | |

2,6-dichlorobenzonitrile is also formed when quinoline is used instead of pyridine or beta-picoline.

The above examples are presented to illustrate particular embodiments of this invention and should not be interpreted as limiting the invention.

We claim as our invention:
1. A process for preparing 2,6-dichlorobenzonitrile which comprises reacting in the presence of a catalytic quantity of a heterocyclic nitrogen base at a temperature within the range of from about 120° C. to about 240° C., 6-chloro-2-nitrotoluene or 2,6-dinitrotoluene with a chlorinating agent selected from elemental chlorine, sulfuryl chloride, phosphorus pentachloride, hydrogen chloride, and thionyl chloride.
2. A process according to claim 1 wherein the nitrogen base is pyridine.
3. A process for preparing 2,6-dichlorobenzonitrile which comprises reacting in the presence of a catalytic quantity of pyridine at a temperature within the range of from about 120° C. to about 240° C., 6-chloro-2-nitrotoluene and elemental chlorine.
4. A process for preparing 2,6-dichlorobenzonitrile which comprises reacting in the presence of a catalytic quantity of pyridine at a temperature within the range of from about 120° C. to about 240° C., 2,6-dinitrotoluene and thionyl chloride.

No references cited.

CHARLES B. PARKER, *Primary Examiner.*

JOSEPH P. BRUST, *Examiner.*

D. H. TORRENCE, *Assistant Examiner.*